A. REICHERT.
APPARATUS FOR MAKING COFFEE.
APPLICATION FILED NOV. 7, 1911.
1,075,727.
Patented Oct. 14, 1913.
2 SHEETS—SHEET 1.
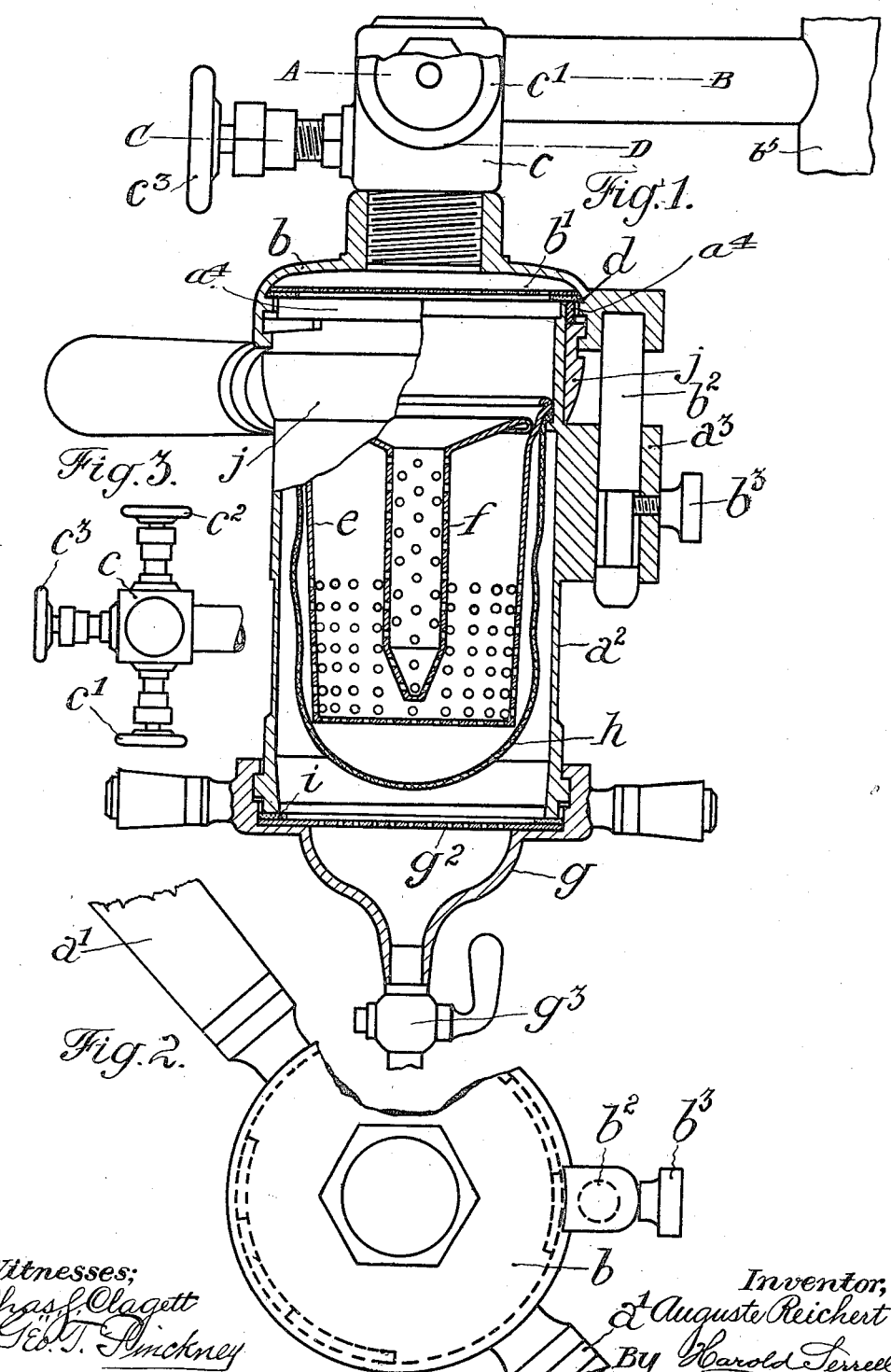
Witnesses:
Chas. L. Clagett
Geo. T. Pinckney
Inventor,
Auguste Reichert
By Harold Terrell
his Attorney.

A. REICHERT.
APPARATUS FOR MAKING COFFEE.
APPLICATION FILED NOV. 7, 1911.
1,075,727.
Patented Oct. 14, 1913.
2 SHEETS—SHEET 2.
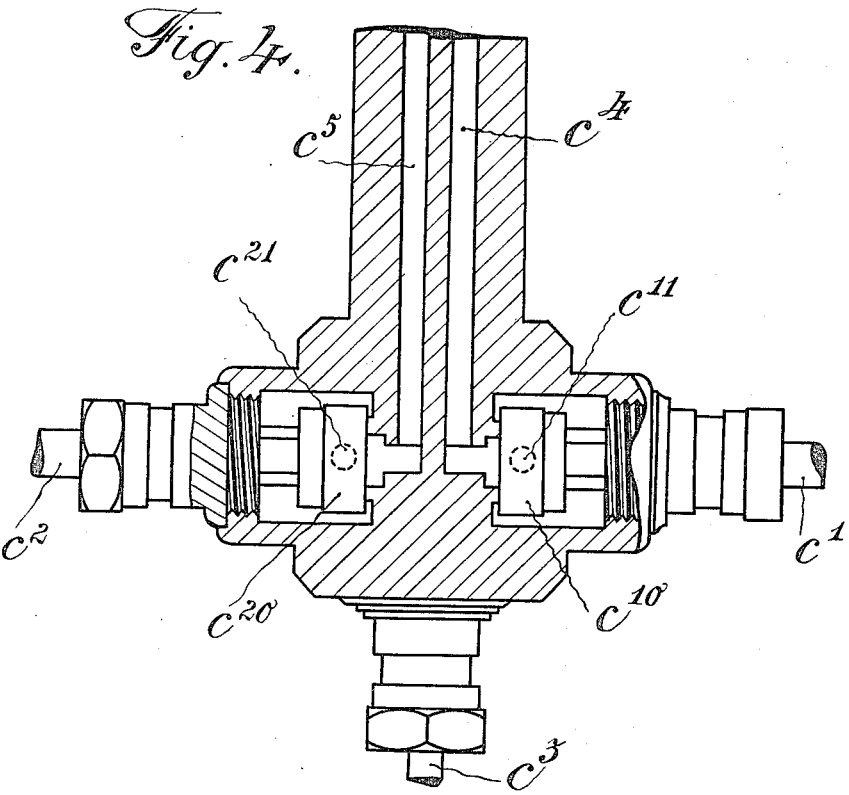
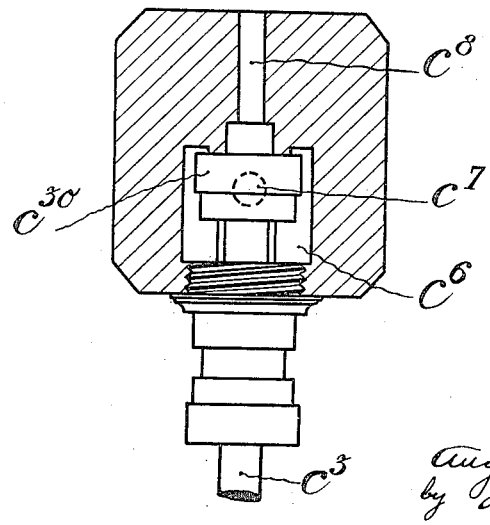

UNITED STATES PATENT OFFICE.

AUGUSTE REICHERT, OF GENEVA, SWITZERLAND.

APPARATUS FOR MAKING COFFEE.

1,075,727.  Specification of Letters Patent.  Patented Oct. 14, 1913.

Application filed November 7, 1911. Serial No. 658,990.

*To all whom it may concern:*

Be it known that I, AUGUSTE REICHERT, hotel-keeper, a citizen of Switzerland, residing at Geneva, Canton of Geneva, in the Confederation of Switzerland, have invented certain new and useful Improvements in Apparatus for Making Coffee, of which the following is a specification.

My invention relates to an apparatus for making coffee, and is an improvement upon the coffee making apparatus shown and described in my application Serial No. 600,121, filed December 30th, 1910, for Letters Patent for an improvement in machines for cooking breakfasts and other light meals; the apparatus shown and described herein is one for preparing coffee, and together with a boiler and a three-way cock, the apparatus comprises a support secured to the three-way cock, a casing or body member in which coffee is prepared, means for connecting and disconnecting the body member with and from the said support, and means upon which when disconnected, from the said support, the body member is movable longitudinally thereof, and upon which said body member may also be swung, as will be hereinafter more particularly described.

In the drawing:—Figure 1 is a vertical section of my improved apparatus for making coffee, and Fig. 2 a plan view of the same, Fig. 3 a plan view on a smaller scale of the steam and water distributing device. Fig. 4 is an enlarged cross section on line A, B, of Fig. 1, and Fig. 5 is a cross section on line C, D, Fig. 1.

The cylindrical body $a^2$ is secured to a support piece $b$ by means of a rod $b^2$ of the same, this rod being adapted to slide in a lug $a^3$ on the body $a^2$ and is provided with a recess into which extends the end of a screw $b^3$ placed in the lug $a^3$, so that the cylindrical body $a^2$ can be removed from the support piece only a limited distance, but can be turned around the rod. The body $a^2$ can further be tightly secured to the support piece $b$.

The support $b$ is secured to the lower part of a hot water and steam distributing device $c$ which is designed to be connected to a boiler not shown in the drawing. The device $c$ is provided with hand wheels $c^1$, $c^2$, $c^3$ controlling valves which make it possible to regulate either the admission of hot water, or of steam, and to connect the inside of the apparatus with the atmosphere as will be hereinafter more particularly described. The piece $b$ is provided with a perforated plate $b^1$ which retains at the entrance of the apparatus any foreign body which might be in the water used for the preparation of the coffee. Within the body $a^2$ of the apparatus there is a receptacle $e$ for the ground coffee, and the edge of this receptacle is supported by an inner projection or flange on the body $a^2$. The said receptacle is perforated at its lower portion to permit the water coming from the distributing device $c$ to pass into the lower portion of the body $a^2$ after its passage through the coffee. Into this receptacle $e$ extends a perforated cylindrical portion of a funnel $f$ which portion extends practically the entire length of the receptacle $e$, the rim of said funnel resting in a groove in the upper edge of the receptacle $e$ by which the funnel is supported. Between the latter and the inner projection of the body $a^2$ a pocket $h$ of cloth surrounding the receptacle $e$ is placed and this serves as filter.

To the lower extremity of the body $a^2$ a removable bottom $g$ is secured by means of a bayonet joint which is rendered tight by means of a ring $i$ of an elastic material. In this bottom there is a perforated plate $g^2$ and the bottom is provided with an outlet cock $g^3$ for the coffee.

The cylindrical body $a^2$ is secured to the support piece $b$ by means of a bayonet joint, the joint of which is rendered tight by means of a ring $d$ which is placed between the body $a^2$ and the support piece $b$. One of the portions of the bayonet joint is formed by the said support piece $b$ itself and is provided with the necessary grooves and projections, while the other portion is formed by an annular piece $j$ provided with the corresponding projections and grooves and which can turn but not slide on the body $a^2$. This annular piece $j$ is provided with handles $a^1$ and is secured in position on the outer surface of the body member $a^2$ at the top end thereof, by means of a ring indicated at $a^4$, which is secured in any suitable manner to the extremity of the body member $a^2$.

Referring particularly to Figs. 4 and 5, it will be seen that the three-way cock or distributing device indicated at $c$, is provided with channels $c^4$ and $c^5$, which communicate respectively with the lower and upper portions of a steam boiler $b^5$, of any suitable construction. The passage $c^4$ is controlled by a valve $c^{10}$ which is operated by a hand wheel $c'$, and similarly a passage $c^5$ is controlled by a valve $c^{20}$ which is operated by a hand wheel $c^2$. The valves $c^{10}$ and $c^{20}$ are contained respectively in suitable chambers which by passages $c^{11}$ and $c^{21}$ communicate with a valve chamber $c^6$ in which is a valve $c^{30}$ controlling a passage $c^8$ communicating with the atmosphere. The valve chamber $c^6$ communicates by a passage $c^7$ with the interior of the support piece $b$ and hence with the interior of the casing or body member $a^2$.

Now as will be apparent from the foregoing description, when the valve $c^{10}$ is opened, a passageway for the hot water may be provided from the boiler through the passage $c^4$, the valve chamber in which the valve $c^{10}$ is located, through the passage $c^{11}$ to the valve chamber $c^6$ and thence through the passage $c^7$ to the interior of the casing or body member $a^2$. The valve $c^{10}$ being closed and the valve $c^{20}$ being opened, a passageway is provided for the steam from the boiler, through the passage $c^5$ to the chamber in which the valve $c^{20}$ is located, through the passage $c^{21}$ to the valve chamber $c^6$ thence through the passage $c^7$ to the interior of the casing or body member $a^2$. Both the valve $c^{10}$ and $c^{20}$ being closed and the valve $c^{30}$ being opened, communication is provided from the interior of the casing or body member $a^2$ by way of the passage $c^7$, valve chamber $c^6$, passage $c^8$ to the atmosphere.

If one desires to make coffee with this apparatus the body $a^2$ is first removed from the support piece $b$ by turning the annular piece $j$ in one direction by means of the handles $a^1$ and is swung on the rod $b^2$ in order to bring the top of the body $a^2$ to a position not beneath the support $b$ to make it possible to remove the funnel $f$ and to put ground coffee in to the receptacle $e$. In this position the body $a^2$ is supported on the rod $b^2$. Then the funnel is replaced and the body $a^2$ is brought back under the piece $b$ and tightly secured to it by means of the bayonet joint in turning the annular piece $j$ in the opposite direction. Hot water is then admitted into the apparatus and by means of the funnel $f$ is rapidly and uniformly distributed throughout the mass of ground coffee, which is in the receptacle $e$, so that the coffee is quickly made. The coffee which is filtered by the pocket $h$ and the perforated plate $g'$ may be drawn in an absolutely clear state by opening the cock $g^3$. When the apparatus is opened in order to put a new quantity of ground coffee into it, it is advisable to first connect the inside of the body $a^2$ with the atmosphere by means of the distributing device $c$, before removing the said body from the support piece $b$, in order to relieve the pressure in the apparatus and in order to prevent the coffee from being projected should the apparatus be opened while it still contains steam.

According to the quantity of coffee to be prepared more or less deep receptacles are employed. In that manner one cup or twenty liters of coffee can be made with the same coffee-machine. For the preparation of small quantities the funnel $f$ may be omitted.

The pocket $h$ can be removed and replaced by a felt washer placed on the perforated plate $g^1$ or it can be employed together with such a felt washer.

I claim as my invention.

1. An apparatus for making coffee, comprising a body member, a support therefor, a connection for securing the body member to the support, a projection depending from the said support, and means associated with the said body member and into which the said projection passes so that by the said projection and means, the said body member, when disconnected from its support, is movable longitudinally and is also adapted to swing laterally.

2. In an apparatus for making coffee, the combination with the boiler and the three-way cock connected thereto, of a body member, a support therefor secured to the said three-way cock, a removable bottom connected to the said body member, a cock connected in the removable bottom, a connection for securing the body member to the said support, a projection depending from the said support, and means associated with the said body member and into which the said projection passes so that by the said projection and means, the said body member, when disconnected from its support, is movable longitudinally and is also adapted to swing laterally.

3. In an apparatus for making coffee, the combination with a steam boiler and a three-way cock connected thereto by which hot water or steam may be conveyed to the apparatus and the interior of the apparatus may be connected with the atmosphere, of a body member, a support therefor secured to the said three-way cock, a ring connected to the upper end of the said body member and adapted therewith to make a bayonet joint, and means for supporting the said body member when disconnected from the said support and upon which means the said body member is movable longitudinally and also adapted to swing laterally in its upright position when so disconnected from the said support.

4. In an apparatus for making coffee, the combination with a steam boiler and a three-way cock connected thereto by which hot water or steam may be conveyed to the apparatus and the interior of the apparatus may be connected with the atmosphere, of a body member, a support therefor secured to the said three-way cock, means whereby the body member may be connected to and disconnected from the said support, a pin secured to and depending from the said support, a lug on the said body member having an aperture therein through which the said pin passes, and means for limiting the longitudinal movement of the said body member and lug on the said pin.

5. In an apparatus for making coffee, the combination with a steam boiler and a three-way cock connected thereto by which hot water or steam may be conveyed to the apparatus and the interior of the apparatus may be connected to the atmosphere, of a body member, a support therefor secured to the said three-way cock, a ring connected to the upper end of the said body member and adapted therewith to make a bayonet joint, a pin secured to and depending from the said support, a lug on the said body member having an aperture therein through which the said pin passes, and means for limiting the longitudinal movement of the said lug and body member on the said pin.

In testimony whereof I have affixed my signature in presence of two witnesses.

AUGUSTE REICHERT.

Witnesses:
  ROD. DE WURTEMBERG,
  L. H. MUNIER.

---

Copies of this patent may be obtained for five cents each, by addressing the "Commissioner of Patents, Washington, D. C."